(12) United States Patent
Hecky (10) Patent No.: US 12,447,710 B2
(45) Date of Patent: Oct. 21, 2025

(54) ARRANGEMENT FOR PRODUCING A CORRUGATED BOARD WEB LAMINATED ON BOTH SIDES

(71) Applicant: BHS Corrugated Maschinen—und Anlagenbau GmbH, Weiherhammer (DE)

(72) Inventor: Thomas Hecky, Weiden (DE)

(73) Assignee: BHS CORRUGATED MASCHINEN-UND ANLAGENBAU GMBH, Weiherhammer (DE)

( * ) Notice: Subject to any disclaimer, the term of this patent is extended or adjusted under 35 U.S.C. 154(b) by 23 days.

(21) Appl. No.: 18/557,626

(22) PCT Filed: Apr. 22, 2022

(86) PCT No.: PCT/EP2022/060707
§ 371 (c)(1),
(2) Date: Oct. 27, 2023

(87) PCT Pub. No.: WO2022/229022
PCT Pub. Date: Nov. 3, 2022

(65) Prior Publication Data
US 2024/0208175 A1    Jun. 27, 2024

(30) Foreign Application Priority Data

Apr. 28, 2021 (DE) .................. 10 2021 204 254.6

(51) Int. Cl.
*B31F 1/28* (2006.01)
(52) U.S. Cl.
CPC ............ *B31F 1/285* (2013.01); *B31F 1/2881* (2013.01)

(58) Field of Classification Search
CPC .............................. B31F 1/2881; B31F 1/285
See application file for complete search history.

(56) References Cited

U.S. PATENT DOCUMENTS 1,146,771 A * 7/1915 Raffel .................... B31F 1/285
                                                        156/470
5,071,507 A * 12/1991 Birke ................... B31F 1/2877
                                                        156/550
(Continued)

FOREIGN PATENT DOCUMENTS

DE        3818658 A1    12/1989
DE      69710004 T2     8/2002
(Continued)

*Primary Examiner* — Thomas M Wittenschlaeger
(74) *Attorney, Agent, or Firm* — McGlew and Tuttle, P.C.

(57) ABSTRACT

An assembly for producing a corrugated cardboard web laminated on both sides from a laminating web and at least one corrugated cardboard web laminated on one side has a first pressing nip for guiding the at least one corrugated cardboard web laminated on one side, and at least one heating element for heating at least one corrugated cardboard web laminated on one side in the pressing nip and a second pressing nip arranged downstream of the first pressing nip for pressing the at least one corrugated cardboard web laminated on one side and the laminating web against one another. The assembly for producing a corrugated cardboard web laminated on both sides also has a laminating web guide arranged at a distance from the first pressing nip for guiding the laminating web at a distance from the first pressing nip to the second pressing nip.

26 Claims, 6 Drawing Sheets

(56) References Cited

U.S. PATENT DOCUMENTS

| | | | |
|---|---|---|---|
| 5,902,502 A | 5/1999 | Sissons et al. | |
| 6,032,713 A | 3/2000 | Ishibuchi et al. | |
| 6,048,429 A | 4/2000 | Cummings et al. | |
| 9,884,497 B2 | 2/2018 | Mark et al. | |
| 10,293,588 B2 | 5/2019 | Fischer et al. | |
| 2013/0228286 A1* | 9/2013 | Brivio | B31D 1/0075 |
| | | | 156/499 |
| 2015/0151505 A1 | 6/2015 | Van Berlo et al. | |

FOREIGN PATENT DOCUMENTS

| | | |
|---|---|---|
| DE | 102014208574 A1 | 11/2014 |
| DE | 102015218333 A1 | 3/2017 |
| WO | 9818614 A1 | 5/1998 |

\* cited by examiner

ARRANGEMENT FOR PRODUCING A CORRUGATED BOARD WEB LAMINATED ON BOTH SIDES

CROSS-REFERENCES TO RELATED APPLICATIONS

This application claims the priority of German Patent Application, Serial No. DE 2021 204 254.6, filed Apr. 28, 2021, the content of which is incorporated herein by reference in its entirety as if fully set forth herein.

FIELD OF THE INVENTION

The invention relates to an assembly for producing a corrugated cardboard web laminated on both sides from a laminating web and at least one corrugated cardboard web laminated on one side. Further, the invention is directed to a corrugated cardboard system for producing corrugated cardboard comprising such an assembly for producing a corrugated cardboard web laminated on both sides. The invention is further directed to a method for producing a corrugated cardboard web laminated on both sides.

BACKGROUND OF THE INVENTION

Corrugated cardboard systems are generally known from the prior art through obvious prior use. There, corrugated webs are generally glued to cover webs to form corrugated cardboard webs laminated on one side. A corrugated cardboard web laminated on one side is then glued to a laminating web to form a corrugated cardboard web laminated on both sides or double-sided corrugated cardboard web. As a rule, glue is used for this purpose, the adhesive properties of which can be activated by supplying heat. The heat transfer to the different gluing points to activate the glue is extremely difficult, as the webs, in particular in the laminate, insulate extremely well thermally. Often, the webs are heated in homogeneously, which can lead to damage or loss of quality.

SUMMARY OF THE INVENTION

It is an object of the invention to provide an improved assembly for producing a corrugated cardboard web laminated on both sides. In particular, the assembly for producing a corrugated cardboard web laminated on both sides should be capable of overcoming the problems of the prior art and producing a corrugated cardboard web laminated on both sides of extremely high quality. A corresponding corrugated cardboard system and a corresponding method for producing a corrugated cardboard web laminated on both sides shall also be provided.

According to the invention, this object is achieved by an assembly for producing a corrugated cardboard web laminated on both sides from a laminating web and at least one corrugated cardboard web laminated on one side, with at least one first pressing nip for guiding the at least one corrugated cardboard web laminated on one side, with at least one heating element for heating at least one corrugated cardboard web laminated on one side in the at least one first pressing nip, with at least one second pressing nip, arranged downstream of the at least one first pressing nip, for pressing the at least one corrugated cardboard web laminated on one side and the laminating web against one another, and with a laminating web guide, spaced from the at least one first pressing nip for guiding the laminating web spaced from the at least one first pressing nip to the at least one second pressing nip, a corrugated cardboard system for producing corrugated cardboard, comprising a laminating web dispensing assembly for dispensing a laminating web, at least one production apparatus for producing a respective corrugated cardboard web laminated on one side, and an assembly arranged downstream of the laminating web dispensing assembly and the at least one production apparatus for producing a respective corrugated cardboard web laminated on one side and a method for producing a corrugated cardboard web laminated on both sides from a laminating web and at least one corrugated cardboard web laminated on one side, comprising the steps of guiding the at least one corrugated cardboard web laminated on one side by means of at least one first pressing nip, heating at least one corrugated cardboard web laminated on one side in the at least one first pressing nip by means of at least one heating element, and pressing the at least one first corrugated cardboard web laminated on one side and the laminating web against one another by means of at least one second pressing nip which is arranged downstream of the at least one first pressing nip, wherein the laminating web is guidable to the at least one second pressing nip by means of a laminating web guide spaced from the at least one first pressing nip. The essence of the invention is a laminating web guide which is capable of guiding the laminating web at a distance from the at least one first pressing nip, which in turn is capable of guiding the at least one corrugated cardboard web laminated on one side and, if applicable, also the laminating web together with the latter. The laminating web can be guided in the laminating web guide, for example, at a distance from or spatially removed from the at least one heating element to the at least one second pressing nip. In this way, it can be prevented, for example, that the laminating web heats up undesirably, in particular too much, and experiences damage, for example due to increased friction caused thereby. This is particularly problematic when the laminating web is printed. The laminating web guide thus preferably forms a kind of bypass.

The at least one corrugated cardboard web laminated on one side and the laminating web are transported in one transport or conveying direction, in particular continuously, during operation of the assembly for producing a corrugated cardboard web laminated on both sides. The at least one second pressing gap is arranged downstream of the at least one first pressing gap in relation to the conveying direction of the corrugated cardboard web laminated on one side.

The terms "arranged upstream", "arranged downstream", "downstream", "upstream" or the like used here refer in particular to the conveying direction of the at least one corrugated cardboard web laminated on one side, the laminating web or the corrugated cardboard web laminated on both sides.

Preferably, the at least one first pressing nip and/or the at least one second pressing nip extend at least partially, preferably at least largely, horizontally. It is convenient if the at least one first pressing nip and the at least one second pressing nip extend at least partially, preferably at least largely, parallel or in a common plane.

The at least one heating element is preferably configured as a heat exchanger. It is preferably heatable electrically, with thermal oil, hot water and/or steam. The at least one heating element is preferably capable of transmitting heat by radiation and/or convection. It preferably directly heats the corrugated cardboard web laminated on one side running adjacent thereto in the at least one first pressing nip. It is advantageous if it is arranged adjacent to the at least one first pressing nip. It is advantageously plate-like. It is advantageous if the at least one heating element is manufactured by welding or casting.

In the at least one first pressing nip, for example, the webs guided there, such as the at least one corrugated cardboard web laminated on one side and the laminating web or several corrugated cardboard webs laminated on one side, can be pressed against each other. For example, one web can be pressed against the at least one heating element.

Preferably, the laminating web guide comprises at least one infeed device on the input side, such as an infeed roller, a curved infeed element and/or an infeed brush device. The at least one infeed device is preferably displaceable and/or heatable.

It is convenient if the corrugated cardboard web laminated on both sides is endless. For example, it is three-ply, five-ply or seven-ply.

The assembly for producing a corrugated cardboard web laminated on both sides is preferably designed as a heating and pulling assembly or heating-pressing assembly.

It is convenient if the laminating web dispensing assembly is designed as a laminating web splicing assembly for dispensing an endless laminating web.

It is advantageous if the at least one production apparatus for producing a respective corrugated cardboard web laminated on one side comprises a corrugating device for corrugating a material web to be corrugated to form a corrugated web.

It is advantageous if the at least one production apparatus for producing a respective corrugated cardboard web laminated on one side has a gluing device for gluing the corrugated web.

Further advantageous embodiments of the invention are given hereinafter.

The at least one first pressing belt which spatially delimits the at least one first pressing nip at least in regions is preferably endless. It is expedient if the at least one first pressing belt forms an upper pressing belt in the assembly for producing a corrugated cardboard web laminated on both sides. Advantageously, the pressing belt is guided around rollers, in particular deflection rollers. Preferably, at least one of these rollers is rotatably drivable for driving the at least one first pressing belt. The at least one first pressing belt leads in particular to a pressing of the webs in the at least one first pressing nip against one another and preferably to a pressing of the webs in the at least one first pressing nip in the direction of the at least one heating element. It also enables the at least one corrugated cardboard web laminated on one side to be conveyed. Alternatively or additionally, the at least one first pressing nip is spatially limited by at least one first pressing roller or at least one first pressing module.

It is useful if the at least one first pressing belt is formed as a fabric belt, felt belt or screen belt. For example, the at least one first pressing belt is coated in order to increase adhesion between the adjacently running corrugated cardboard web laminated on one side and the at least one first pressing belt.

The assembly in which the at least one first pressing belt also spatially delimits the at least one second pressing nip at least in regions is particularly functionally reliable and results in a particularly high-quality corrugated cardboard web laminated on both sides. Synchronization between the at least one first pressing nip and the at least one second pressing nip or corresponding pressing devices is thus unnecessary.

The at least one second pressing belt which spatially delimits the laminating web guide at least in regions is preferably endless. It is expedient if the pressing belt forms a lower pressing belt in the assembly for producing a corrugated cardboard web laminated on both sides. It is advantageous if the at least one second pressing belt is guided around rollers, in particular deflection rollers. Preferably, at least one of these rollers is rotatably drivable for driving the at least one second pressing belt. In particular, the at least one second pressing belt allows pressurization of the laminating web in the laminating web guide, for example in the direction of at least one laminating web heating element. It also allows the laminating web to be conveyed. Alternatively or additionally, the laminating web guide is spatially limited by at least one guide roller or at least one guiding module.

The assembly in which the at least one second pressing belt also spatially delimits the at least one second pressing nip at least in regions is particularly functionally reliable and allows the production of a high-quality corrugated cardboard web laminated on both sides. Synchronization between the laminating web guide and the second pressing nip or corresponding devices is thus unnecessary.

It is advantageous if the at least one second pressing belt is designed as a fabric belt, felt belt or screen belt. It is preferably open-pored or permeable, at least in some regions, in order to enable, for example, with the at least one first pressing nip, heat transport at least to the laminating web, if the latter runs there, or preferably at least to the corrugated cardboard web laminated on one side and running adjacently thereto. For example, the at least one second pressing belt is coated to increase adhesion between the at least one second pressing belt and the laminating web. For example, the at least one second pressing belt is heated or heatable.

The at least one tension changing device for changing a tension of the at least one second pressing belt is preferably formed by a roller around which the at least one second pressing belt is guided. This is preferably adjustable or displaceable, in particular perpendicularly to its center axis. It is expedient if, by actuating the at least one tension changing device, a pressing force of the at least one second pressing belt on the laminating web in the laminating web guide and/or in the at least one second pressing nip is adjustable. Preferably, the pressing force is dependent on a required heating of the laminating web or the corrugated cardboard web laminated on both sides. It is expedient if the at least one tension changing device is arranged on the input side in relation to the laminating web guide.

The gluing unit for gluing the corrugated cardboard web laminated on one side that is to be glue-bonded to the laminating web is arranged downstream of the at least one first pressing nip and upstream of the at least one second pressing nip. It is useful if the gluing unit has a glue bath. Advantageously, the gluing unit has a glue application roller for applying the glue from the glue bath to the corrugated cardboard web laminated on one side, in particular to the corrugated web thereof, which is to be glue-bonded to the laminating web. A glue dosing roller is preferably associated with the glue application roller in order to form a uniform film of glue on the glue application roller. It is useful if the gluing unit has at least one pressing roller for pressing the corrugated cardboard web laminated on one side to be glued against the glue application roller.

The gluing unit may be designed and/or arranged in such a manner that gluing of the corrugated cardboard web laminated on one side to be glued takes place from below.

Free peaks of the corrugation of the corrugated cardboard web laminated on one side are thus directed downwards there.

It is expedient if the gluing unit is at least partially vertically and/or horizontally or laterally displaceable between an active position and an inactive position. In particular, at least one glue application roller and/or pressing roller of the gluing unit can be displaced accordingly. Preferably, at least one drive, motor or the like is provided for this purpose. When the gluing unit is not used, such as during normal operation of the assembly for producing a corrugated cardboard web laminated on both sides, the gluing unit is at least partially displaceable into its inactive position, which preferably is constituted by a parking position. In normal operation, the at least one corrugated cardboard web laminated on one side and the laminating web are guided through the at least one first pressing nip. The active position of the gluing unit, on the other hand, is constituted by a gluing position.

It is useful if the gluing unit which is displaceable in its entirety between the active position and the inactive position, preferably in a height direction and/or in a transverse direction of the assembly, is in an inactive position, for example, laterally or next to the assembly or the webs. It is thus displaced horizontally in a transverse direction of the assembly/corrugated cardboard system or perpendicularly to a longitudinal direction of the assembly/corrugated cardboard system. It is then horizontally displaced in a transverse direction of the webs. Advantageously, the gluing unit can be moved horizontally sideways out of the assembly/corrugated cardboard system. Preferably, at least one drive, motor or the like is provided for this purpose.

The at least one first pressing belt is guided through the gluing unit, preferably with its lower belt. In particular, it is guided through between at least one pressing roller and glue application roller of the gluing unit.

Alternatively the at least one pressing belt is guided past the gluing unit, in particular at the top. As a result, it can be effectively prevented that the at least one first pressing belt is provided with glue, in particular over a large area, especially if the at least one corrugated cardboard web laminated on one side is not guided by the gluing unit. Furthermore, a particularly simple cleaning, maintenance or servicing of the gluing unit is possible in this way. It is expedient if the gluing unit, in particular in its entirety, can be moved laterally out of the assembly for producing a corrugated cardboard web laminated on both sides. It is advantageous if the gluing unit is in a raised or active position during pressure operation. Preferably, the gluing unit is in a lowered or inactive position during normal operation or production. Reversed positions are alternatively possible.

The embodiment in which at least one laminating web heating element is arranged to heat the laminating web in the laminating web guide allows heating of the laminating web in the laminating web guide. It is expedient if the at least one laminating web heating element can be heated electrically, with thermal oil, hot water and/or steam. It preferably delimits the laminating web guide at least in some regions, advantageously upwards. Preferably, the laminating web abuts at least partially directly against the at least one laminating web heating element.

The at least one laminating web heating element which is curved preferably has a curved laminating web contact surface for corresponding guidance or contact of the laminating web. The conveyed laminating web can be deflected accordingly.

The embodiment in which the at least one laminating web heating element is adjustable allows, for example, an adaptation to the respective laminating web. Preferably, heating of the laminating web can thus be influenced, for example via an effective contact surface. For example, the at least one laminating web heating element can be vertically displaced at least in some regions and/or can be pivoted about a respective horizontal pivot axis.

Alternatively, the at least one laminating web heating element is immobile and/or flat.

The embodiment in which the laminating web is guided in the laminating web guide in such a manner that an outer side of the laminating web faces away from the at least one laminating web heating element prevents in particular damage to the outer side of the laminating web by the at least one laminating web heating element, which is particularly advantageous if the outer side is printed. It is expedient if the at least one laminating web heating element heats the laminating web from above or is arranged there above the laminating web.

The assembly in which the assembly is designed in such a manner that the laminating web is guidable either through the laminating web guide or the at least one first pressing nip to the at least one second pressing nip allows the laminating web to be guided in two different ways. The laminating web guide allows the laminating web to be guided past the at least one first pressing nip, so that the laminating web guide forms a kind of bypass guide. However, the laminating web can also be guided through the at least one first pressing nip together with at least one corrugated cardboard web laminated on one side, if desired. Preferably, the respective path of the laminating web is selected in dependence on the formation of the laminating web, in particular in dependence on a printing of the latter. In the laminating web guide, the laminating web is protected and can be guided gently.

It is expedient if the at least one corrugated web steam feeding apparatus for feeding steam to a respective corrugated web of the at least one corrugated cardboard web laminated on one side also delimits the at least one first pressing nip or is arranged adjacent thereto. The at least one corrugated web steam feeding apparatus is preferably capable of remoistening the respective corrugated web of at least one adjacently extending corrugated cardboard web laminated on one side there. It is convenient if the at least one corrugated web steam feeding apparatus heats the respective corrugated cardboard web laminated on one side.

The at least one glue-steam feeding apparatus for feeding steam to glue of the corrugated cardboard web laminated on one side and to be glue-bonded to the laminating web is preferably arranged upstream of the at least one second pressing nip and is advantageously arranged adjacent thereto. In particular, the at least one glue-steam feeding apparatus is capable of pre-priming the glue of the corrugated cardboard web laminated on one side that is to be glue-bonded with the laminating web.

The embodiment in which a corrugated web of the corrugated cardboard web laminated on one side and to be glue-bonded to the laminating web is guided in such a manner and/or the at least one heating element is arranged in such a manner that the corrugated web faces the at least one heating element in the at least one first pressing nip allows, for example, a particularly high and easily adjustable heat transfer between the at least one heating element and the corrugated cardboard web laminated on one side and to be glue-bonded to the laminating web on one side, if running there.

The at least one contact pressure adjusting device for adjusting a contact pressure of the laminating web and the at least one corrugated cardboard web laminated on one side against one another is designed, for example, as a contact pressure roller, contact pressure chain, contact pressure plate, contact pressing belt or contact pressure shoe. The contact pressure adjusting device is preferably displaceable in the vertical direction. For example, it is arranged upstream of the at least one second pressing nip and then preferably adjacent thereto. Alternatively or additionally, the at least one contact pressure adjusting device is arranged adjacent to the at least one second pressing nip and/or (also) forms the latter.

In the embodiment in which the assembly is designed in such a manner that a gluing connection is established in the at least one first pressing nip between at least two of the corrugated cardboard webs laminated on one side and a gluing connection is established in the at least one second pressing nip between one of the corrugated cardboard webs laminated on one side and the laminating web in an offset manner, in particular offset in time, the gluing connection between the at least two corrugated cardboard webs laminated on one side and the gluing connection between one of the corrugated cardboard webs laminated on one side and the laminating web is temporally and/or spatially offset or divided. The gluing connections start one after the other and preferably run one after the other. Preferably, the laminating web is fed in at a later point in time in order to cause a temporal offset of its gluing connection with a corrugated cardboard web laminated on one side. It is convenient if the gluing connection between the at least two corrugated cardboard webs laminated on one side is incomplete in the at least one first pressing nip when leaving the at least one first pressing nip. Preferably, the gluing connection between the at least two corrugated cardboard webs laminated on one side is not completed before the at least one second pressing nip. Alternatively, it is expedient if the gluing connection between the at least two corrugated cardboard webs laminated on one side is completed or finalized in the at least one first pressing nip when leaving the at least one first pressing nip. This can be influenced, for example, by the at least one heating element or its heating power.

The switch apparatus, which is arranged upstream of the assembly, in particular is actuatable, for guiding the laminating web to the at least one first pressing nip or to the laminating web guide, is preferably adjustable or switchable between different switch positions. For this purpose, it preferably has at least one displaceable, in particular pivotable, for example plate-like, switch element. In a first position of the switch apparatus, the laminating web can be guided, for example, to the at least one first pressing nip, while in a second position of the switch apparatus, the laminating web can be guided to the laminating web guide. According to a preferred embodiment, the switch apparatus is part of the assembly for producing a corrugated cardboard web laminated on both sides and is then arranged on the input side with respect thereto. The switch apparatus can also be the subject-matter of an independent invention. It is then provided for an assembly for producing a corrugated cardboard web laminated on both sides or a corrugated cardboard system.

The at least one severing apparatus, arranged upstream of the switch apparatus, for severing the laminating web for a change of the laminating web between the at least one first pressing nip and the laminating web guide, is preferably capable of severing the laminating web completely in its transverse direction, forming a leading web section and a trailing web section. It is designed, for example, as a jet cutting apparatus such as a water jet or laser jet cutting apparatus. Alternatively, the at least one severing apparatus comprises, for example, at least one blade element which can be driven in rotation or displaced in a traversing manner, for example. The severing apparatus is designed, for example, as a transverse cutting apparatus, short transverse cutting apparatus, longitudinal cutting apparatus, rotary die cutter or the like. The at least one severing apparatus is, for example, a component of the assembly for producing a corrugated cardboard web laminated on both sides and is then arranged on the input side with respect thereto.

The features described above and the embodiments thereof also constitute preferred further embodiments of the method for producing a corrugated cardboard web laminated on both sides from a laminating web and at least one corrugated cardboard web laminated on one side, comprising the steps of guiding the at least one corrugated cardboard web laminated on one side by means of at least one first pressing nip, heating at least one corrugated cardboard web laminated on one side in the at least one first pressing nip by means of at least one heating element, and pressing the at least one first corrugated cardboard web laminated on one side and the laminating web against one another by means of at least one second pressing nip which is arranged downstream of the at least one first pressing nip, wherein the laminating web is guidable to the at least one second pressing nip by means of a laminating web guide spaced from the at least one first pressing nip.

In the following, preferred embodiments of the invention are described by way of example with reference to the enclosed drawing.

DESCRIPTION OF THE PREFERRED EMBODIMENTS

Figure 1:
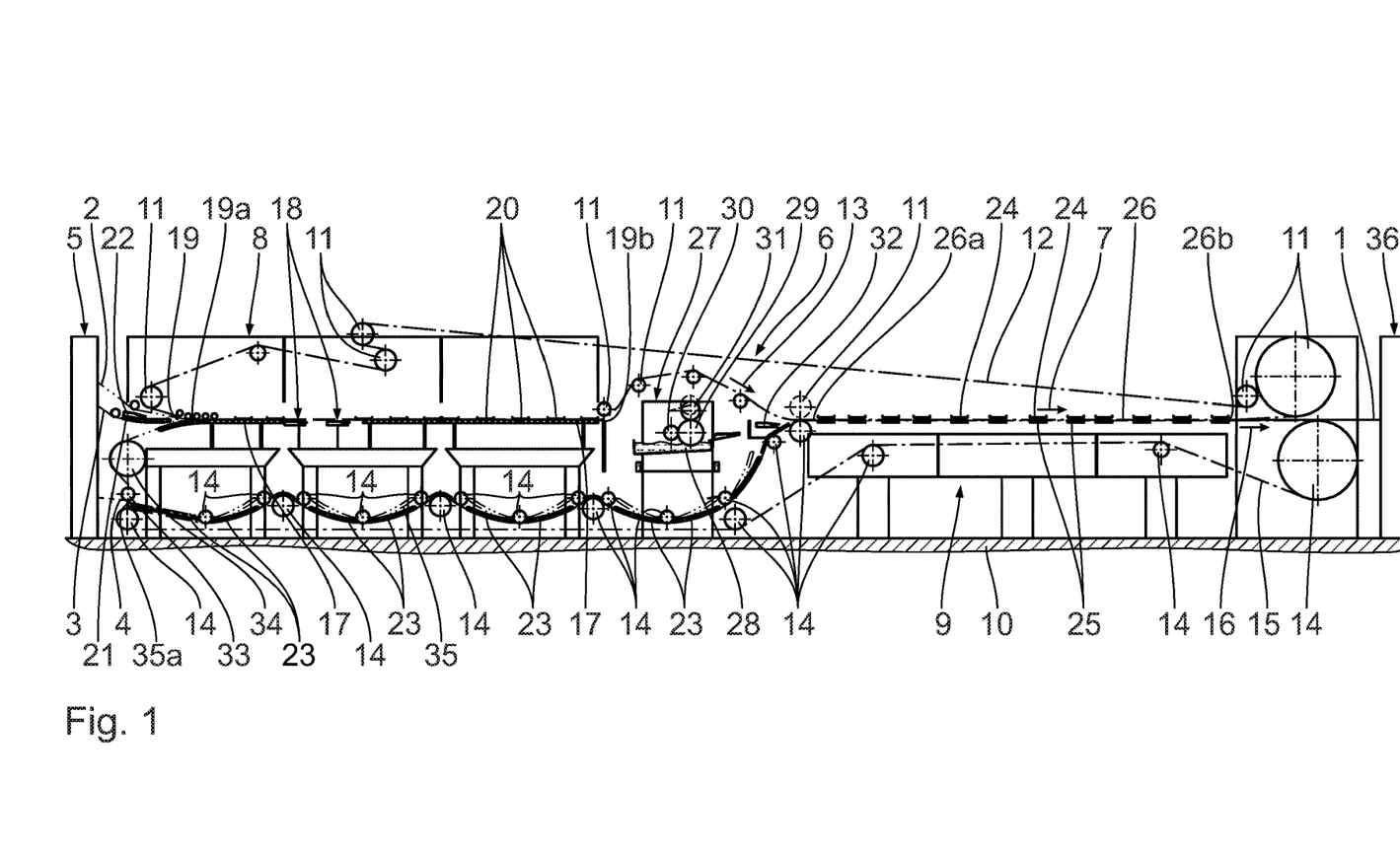
FIG. 1 shows a corrugated cardboard system according to the invention with an assembly for producing a corrugated cardboard web laminated on both sides, wherein the laminating web is guided through a first pressing nip.

Referring first to FIG. 1, a corrugated cardboard system is capable of producing an endless five-ply corrugated cardboard web 1 laminated on both sides or corresponding five-ply corrugated cardboard sheets (not shown) laminated on both sides.

The corrugated cardboard system comprises a first production apparatus for producing a first corrugated cardboard web 2 laminated on one side. A first cover web splicing apparatus for providing an endless first cover web and a first material web splicing apparatus for providing an endless first material web are arranged upstream of the first production apparatus for producing a first corrugated cardboard web 2 laminated on one side.

The first production apparatus for producing a first corrugated cardboard web 2 laminated on one side comprises a rotatably mounted first corrugating roller and a rotatably mounted second corrugating roller for producing an endless first corrugated web having a corrugation from the endless first material web. The corrugating rollers form a first roller nip for passing through and corrugating the endless first material web.

For joining the endless first corrugated web to the endless first cover web to form the first corrugated cardboard web 2 laminated on one side, the first production apparatus for producing a first corrugated cardboard web 2 laminated on one side has a first gluing device which comprises a first glue dosing roller, a first glue container and a first glue application roller. For passing through and gluing the endless first corrugated web, the first glue application roller forms a first glue gap with the first corrugating roller. The glue located in the first glue container is applied to peaks of the corrugation of the endless first corrugated web via the first glue application roller. The first glue dosing roller rests against the first glue application roller and serves to form an even glue layer on the first glue application roller.

The endless first cover web is then joined together with the endless first corrugated web provided with glue from the first glue container in the first production apparatus for producing a first corrugated cardboard web 2 laminated on one side.

For pressing the endless first cover web against the endless first corrugated web provided with glue, which in turn rests in some regions against the first corrugating roller, the first production apparatus for producing a first corrugated cardboard web 2 laminated on one side has a first pressing module, which is favourably designed as a pressing belt module. It is arranged above the first corrugating roller. The first pressing module has two first deflection rollers and an endless first pressing belt which is guided around the two first deflection rollers.

The first corrugating roller engages in a space between the first deflection rollers from below in some regions, whereby the first pressing belt is deflected by the first corrugating roller. The first pressing belt presses against the endless first cover web, which in turn is pressed against the first corrugated web provided with glue and resting against the first corrugating roller.

The corrugated cardboard system further comprises a second production apparatus for producing a second corrugated cardboard web 3 laminated on one side.

The second production apparatus for producing a second corrugated cardboard web 3 laminated on one side is advantageously designed like the first production apparatus for producing a first corrugated cardboard web 2 laminated on one side.

A second cover web splicing apparatus for providing an endless second cover web and a second material web splicing apparatus for providing an endless second material web are arranged upstream of the second production apparatus for producing a second corrugated cardboard web 3 laminated on one side.

The second production apparatus comprises a rotatably mounted third corrugating roller and a rotatably mounted fourth corrugating roller for producing an endless second corrugated web having a corrugation from the endless second material web. The corrugating rollers form a second roller nip for guiding through and corrugating the endless second material web.

For joining the endless second corrugated web with the endless second cover web to form the second corrugated cardboard web 3 laminated on one side, the second production apparatus for producing a second corrugated cardboard web 3 laminated on one side has a second gluing device which comprises a second glue dosing roller, a second glue container and a second glue application roller. For guiding through and gluing the endless second corrugated web, the second glue application roller forms a second glue gap with the third corrugating roller. The glue located in the second glue container is applied to peaks of the corrugation of the endless second corrugated web via the second glue application roller. The second glue dosing roller rests against the second glue application roller and serves to form an even glue layer on the second glue application roller.

The endless second cover web is then joined together with the endless second corrugated web provided with glue from the second glue container in the second production apparatus for producing a second corrugated cardboard web 3 laminated on one side.

For pressing the endless second cover web against the endless second corrugated web provided with glue, which in turn rests in certain regions against the third corrugating roller, the second production apparatus for producing a second corrugated cardboard web 3 laminated on one side has a second pressing module. The second pressing module is advantageously designed as a pressing belt module. It is arranged above the third corrugating roller. The second pressing module has two second deflection rollers and an endless second pressing belt which is guided around the two second deflection rollers.

The third corrugating roller engages in a space between the two second deflecting rollers from below in some regions, whereby the second pressing belt is deflected by the third corrugating roller. The second pressing belt presses against the endless second cover web, which in turn is pressed against the endless second corrugated web provided with glue that rests against the third corrugating roller.

Furthermore, the corrugated cardboard system has a laminating web splicing apparatus for providing an endless laminating web 4. The endless laminating web 4 is single-layered and smooth. It may already have been printed or it may be printed. It can also be or remain unprinted.

Downstream of the first production apparatus for producing a first corrugated cardboard web 2 laminated on one side and the second production apparatus for producing a second corrugated cardboard web 3 laminated on one side as well as the laminating web splicing apparatus, the corrugated cardboard system comprises a gluing unit. The gluing unit has a first gluing roller partially immersed in a first glue bath and capable of gluing the first corrugated web of the first corrugated cardboard web 2 laminated on one side. Further, the gluing unit comprises a second gluing roller partially immersed in a second glue bath and capable of gluing the second corrugated web of the second corrugated cardboard web 3 laminated on one side.

It is useful if a preheating apparatus is arranged upstream of the gluing unit, which preheating apparatus is capable of heating the first corrugated cardboard web 2 laminated on one side and the second corrugated cardboard web 3 laminated on one side as well as the laminating web 4. Preferably, the preheating apparatus has corresponding heating rollers for this purpose, around which the respective web 2, 3 or 4 is wrapped.

The first production apparatus for producing a first corrugated cardboard web 2 laminated on one side, the first cover web splicing apparatus, the first material web splicing apparatus, the second production apparatus for producing a second corrugated cardboard web 3 laminated on one side, the second cover web splicing apparatus, the second material web splicing apparatus, the laminating web splicing apparatus and the gluing unit as well as the preheating apparatus, if present, are together assigned the reference sign 5 according to FIG. 1.

The corrugated cardboard system also has an assembly 6 for producing a corrugated cardboard web 1 laminated on both sides, which is arranged downstream of the gluing unit. In the assembly 6 for producing a corrugated cardboard web 1 laminated on both sides, the first corrugated cardboard web 2 laminated on one side and the second corrugated cardboard web 3 laminated on one side as well as the laminating web 4 are each conveyed in a conveying direction 7.

The assembly 6 for producing a corrugated cardboard web 1 laminated on both sides comprises a first frame 8 and a second frame 9, which is arranged downstream of the first frame 8 in the conveying direction 7. The first frame 8 and the second frame 9 are supported against a surface 10, such as a hall floor, and are arranged spatially separated from each other, for example. Alternatively, they are combined into a common frame.

Several upper or first guide rollers 11 are rotatably mounted on the first frame 8 and second frame 9, the center axes of which run parallel to each other and horizontally as well as perpendicularly to the conveying direction 7. At least one upper guide roller 11 can be driven in rotation by a motor. An endless upper or first pressing belt 12 is guided around the upper guide rollers 11 and can be driven continuously in a first circumferential direction 13.

Several lower or second guide rollers 14 are rotatably mounted on the first frame 8 and second frame 9, the center axes of which run parallel to each other and horizontally as well as perpendicularly to the conveying direction 7. At least one lower guide roller 14 can be driven in rotation by a motor. An endless lower or second pressing belt 15 is guided around the lower guide rollers 14 and can be driven continuously in a second circumferential direction 16.

The first frame 8 carries several plate-shaped heating elements 17, which are arranged at a distance from one another in the conveying direction 7. The first heating element 17 in the conveying direction 7 is designed as an infeed heating element and is configured to be curved. With the exception of the infeed heating element 17, the heating elements 17 form a heating plane.

The first frame 8 also carries corrugated web steam feeding apparatuses 18 which are arranged downstream of each other in the conveying direction 7 and extend in the heating plane or adjacent below the latter. They are capable of ejecting steam upwards. The corrugated web steam feeding apparatuses 18 are preferably arranged between heating elements 17.

A lower belt or underside of the upper pressing belt 11 and an upper belt or top side of the lower pressing belt 15 together form a first pressing nip 19. The lower belt or the lower side of the upper pressing belt 11 and the upper belt or the upper side of the lower pressing belt 15 run parallel to each other and horizontally. They have a common circumferential direction 13 or 16 and extend adjacently to each other. The lower belt or the lower side of the upper pressing belt 11 delimits the first pressing nip 19 upwards, while the upper belt or the upper side of the lower pressing belt 15 delimits the first pressing nip 19 downwards. The first pressing nip 19 has a first infeed 19a and a first outlet 19b.

A further infeed heating element 21 is arranged upstream of the first pressing nip 19, which inlet heating element 21 is arranged on the first frame 8, in particular displaceably, in particular pivotably, and carries a corrugated web steam feeding apparatus 22 at the top. The corrugated web steam feeding apparatus 22 is designed like the corrugated web steam feeding apparatuses 18 and is capable of ejecting steam upwards.

In the region of the first pressing nip 19, first or upper pressing shoes 20 are associated with the upper pressing belt 12, which pressing shoes 20 are arranged at a distance from each other in the conveying direction 7 and there press the lower belt of the upper pressing belt 12 in the direction of the adjacent heating element 17 or downwards.

Several laminating web heating elements 23 are arranged on the first frame 8 below the first pressing nip 19, which are arranged downstream of each other in the conveying direction 7 and are each pivotable. The laminating web heating elements 23 extend between adjacently arranged lower guide rollers 14. An infeed laminating web heating element 23 is configured to be flat, while the laminating web heating elements 23 arranged downstream are each configured to be curved.

The laminating web heating elements 23 together with an upper belt or an upper side of the lower pressing belt 15 form a laminating web guide 35 which is gaplike. The upper belt or the upper side of the lower pressing belt 15 delimits the laminating web guide 35 downwards, while the laminating web heating elements 23 delimit the laminating web guide 35 upwards.

On the second frame 9, several second or upper pressing shoes 24 are arranged, which extend horizontally and at a distance from each other in the conveying direction 7 and, according to a preferred embodiment, are vertically displaceable for adjusting the contact pressure. Associated with the upper pressing shoes 24 are lower counter pressing shoes 25, which are also arranged on the second frame 9. The lower belt or underside of the upper pressing belt 12 and the upper belt or top side of the lower pressing belt 15 run between the upper pressing shoes 24 and lower counter-pressing shoes 25, where they extend adjacent and parallel to each other and horizontally to form a second pressing nip 26. They are pressed towards each other by the upper pressing shoes 24 and lower counter-pressing shoes 25. The lower belt of the upper pressing belt 12 and the upper belt of the lower pressing belt 15 there have a common circumferential direction 13 and 16 respectively and extend adjacent one above the other. The second pressing nip 26 has a second infeed 26a and a second outlet 26b. The laminating web heating elements 23 extend (substantially) to the second pressing nip 26.

The lower guide roller 14, arranged on the infeed side with respect to the laminating web guide 35, is wrapped by the lower pressing belt 15 over a circumferential range between 150° and 250° and is displaceable horizontally to change the tension of the lower pressing belt 15.

Between the first frame 8 and the second frame 9, a gluing unit 27 is arranged, which is supported relative to the base 10. Alternatively, the gluing unit 27 is arranged on the first frame 8 and/or the second frame 9.

The gluing unit 27 has a glue application roller 29 immersed in a glue bath 28, against which glue application roller 29 a glue dosing roller 30 of the gluing unit 27 rests on the circumference. The gluing unit 27 also has a pressing roller 31 which is arranged above and adjacent to the glue application roller 29. The glue application roller 29 and the glue dosing roller 30 as well as the pressing roller 31 extend parallel to each other and horizontally. They run perpendicularly to the conveying direction 7. The glue application roller 29 and the pressing roller 31 are each vertically displaceable between an active gluing position and an inactive parking position.

Between the second pressing nip 26 and the gluing unit 27, a glue-steam feeding apparatus 32 is arranged, which is designed like the corrugated web steam feeding apparatus 18 or 22 and is capable of ejecting steam upwards.

The corrugated cardboard system also has a slitting/creasing apparatus that is arranged downstream of the assembly 6 for producing a corrugated cardboard web 1 laminated on both sides. Slitting units of the slitting/creasing apparatus are capable of cutting the corrugated cardboard web 1 laminated on both sides to form partial corrugated cardboard webs in the conveying direction 7. Creasing units of the slitting/creasing apparatus are capable of creasing the corrugated cardboard web 1 laminated on both sides in order to simplify subsequent folding.

Furthermore, the corrugated cardboard system comprises a switch for dividing the produced partial corrugated cardboard webs into different levels.

The corrugated cardboard system also has a cross-cutting apparatus with partial cross-cutting devices to cut the partial corrugated cardboard webs completely in a transverse or width direction to form corrugated cardboard sheets.

The corrugated cardboard sheets can be stacked in respective stacking trays of the corrugator.

The slitting/creasing apparatus, the switch and the cross-cutting apparatus as well as the stacking trays are collectively assigned the reference sign 36 according to FIG. 1. A short cross-cutting apparatus can also be provided.

In the following, the assembly 6 for producing a corrugated cardboard web 1 laminated on both sides in normal operation is described in particular, which is illustrated in FIG. 1.

The gluing unit glues the first corrugated web of the first corrugated cardboard web 2 laminated on one side with its first gluing roller and the second corrugated web of the second corrugated cardboard web 3 laminated on one side with its second gluing roller.

The endless first corrugated cardboard web 2 laminated on one side and the endless second corrugated cardboard web 3 laminated on one side as well as the endless laminating web 4 are fed to the assembly 6 for producing a corrugated cardboard web 1 laminated on both sides. The pressing belts 12, 15 are each driven in their circumferential direction 13 and 16 respectively.

The first corrugated cardboard web 2 laminated on one side and glued at the bottom is guided upstream to the first pressing nip 19 above the infeed heating element 21. The corrugated web steam feeding apparatus 22 ejects steam from below upwards so that it hits the first corrugated web of the first corrugated cardboard web 2 laminated on one side or the glue located there. This also causes the glue to heat up. The first corrugated web of the first corrugated cardboard web 2 laminated on one side is located there below the first cover web of the first corrugated cardboard web 2 laminated on one side. The first corrugated cardboard web 2 laminated on one side enters the first pressing nip 19 on the infeed side, i.e. via the first infeed 19*a*, (FIG. 1, left), where the first corrugated web of the first corrugated cardboard web 2 laminated on one side is also located below the first cover web of the first corrugated cardboard web 2 laminated on one side.

The second corrugated cardboard web 3 laminated on one side and glued at the bottom is guided along the infeed heating element 21 at the bottom and is heated by the latter from above. The second corrugated web of the second corrugated cardboard web 3 laminated on one side is located there below the second cover web of the second corrugated cardboard web 3 laminated on one side. It enters the first pressing nip 19 on the infeed side below the first corrugated cardboard web 2 laminated on one side, i.e. via the first infeed 19*a*, where the second corrugated web of the second corrugated cardboard web 3 laminated on one side is also located below the second cover web of the second corrugated cardboard web 3 laminated on one side.

The laminating web 4 runs around two deflection rollers 33, 34 arranged one above the other, which are arranged above an infeed or entrance 35*a* of the laminating web guide 35. The laminating web 4 is guided upwards. It is guided via the infeed heating element 17 to the first pressing nip 19 and is heated during this process. It then enters on the infeed side, i.e. via the first infeed 19*a*, into the first pressing nip 19 under the corrugated cardboard webs 2, 3 laminated on one side.

The first corrugated cardboard web 2 laminated on one side and the second corrugated cardboard web 3 laminated on one side as well as the laminating web 4 are pressed against each other in the first pressing nip 19 and glued together to form the corrugated cardboard web 1 laminated on both sides. These are conveyed in the conveying direction 7 through the first pressing nip 19. The laminating web 4 is heated directly from below by the heating elements 17. The corrugated cardboard webs 2, 3 laminated on one side are also heated by the heating elements 17.

The laminating web guide 35 remains unused. The corrugated web steam feeding apparatuses 18 and laminating web heating elements 23 are out of service or inactive.

The corrugated cardboard web 1 laminated on both sides then exits the first pressing nip 19 on the exit side or the outlet side, i.e. via the first outlet 19*b*, and is guided past the gluing unit 27 at the top, for example, like the upper pressing belt 12. The corrugated cardboard web 1 laminated on both sides and the lower belt of the upper pressing belt 12 are guided upwards in the region of the gluing unit 27, for example. The gluing unit 27 is inactive here. It is, for example, in a lower parking position (not shown) or in a lateral parking position (cf. FIG. 2A). The corrugated cardboard web 1 laminated on both sides and the lower belt of the upper pressing belt 12 can thus remain undeflected in the region of the gluing unit 27 and continue to run at the level of the first pressing nip 19. According to FIG. 2A, the gluing unit 27 is moved out of the assembly 6 for producing a corrugated cardboard web 1 laminated on both sides or the corrugated cardboard system horizontally into its lateral parking position.

The glue-steam feeding apparatus 32 is inactive.

The corrugated cardboard web 1 laminated on both sides then enters the second pressing nip 26 on the infeed side, i.e. via the second infeed 26*a*, where the first corrugated cardboard web 2 laminated on one side, the second corrugated cardboard web 3 laminated on one side and the laminating web 4 are preferably pressed further together. They are conveyed through the second pressing nip 26 in the conveying direction 7. The glue of the corrugated cardboard web 1 laminated on both sides hardens further in the second pressing nip 26, for example.

The corrugated cardboard web 1 laminated on both sides then leaves the second pressing nip 26 on the exit side.

Figure 2:
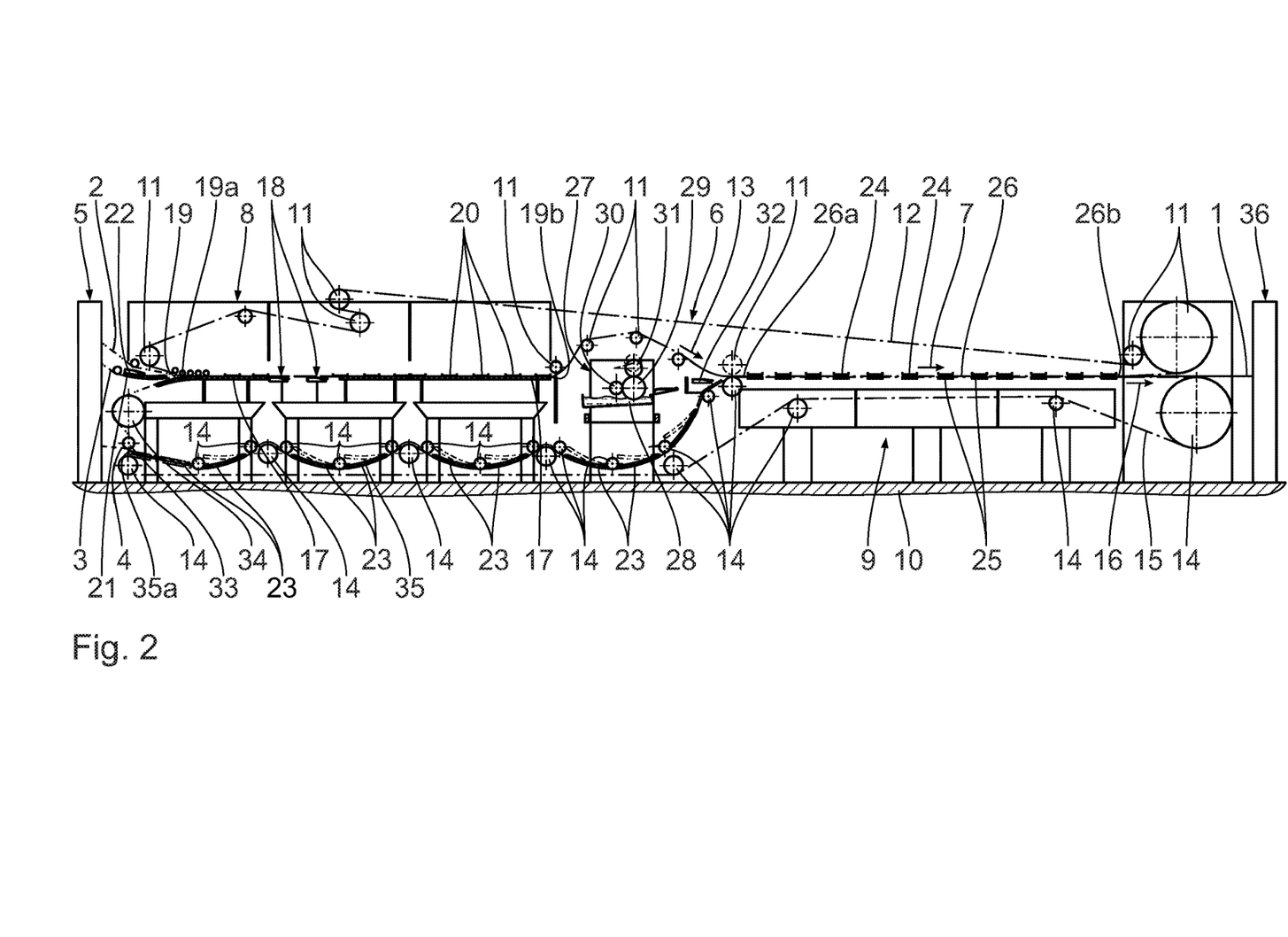
FIG. 2 shows the assembly shown in FIG. 1 for producing a corrugated cardboard web laminated on both sides, wherein, in contrast to FIG. 1, the laminating web is guided through a laminating web guide.
Figure 2A:
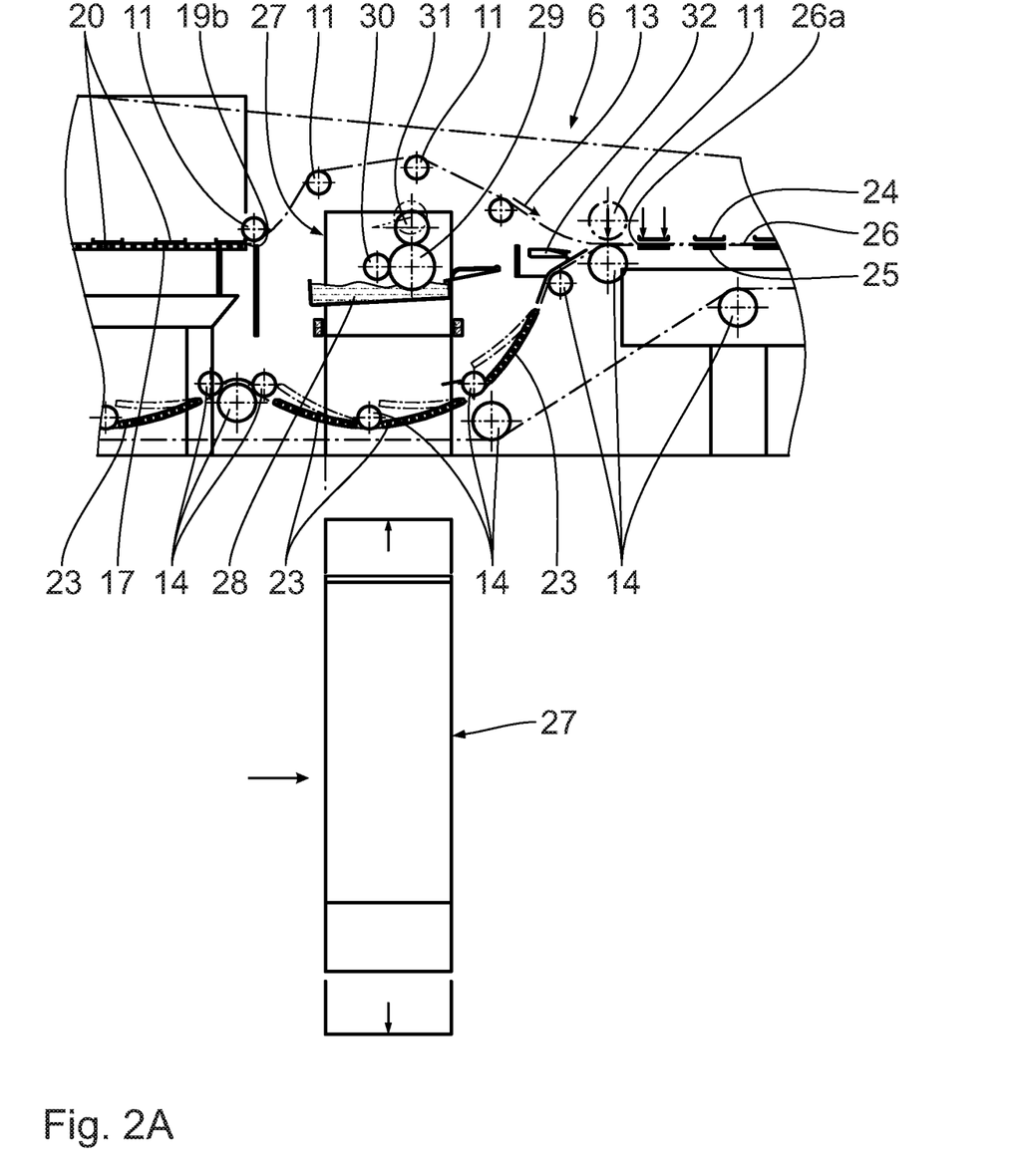
FIG. 2A shows a section of FIG. 1, 2 showing a gluing unit in a lateral parking position.

In the following, a second operation, such as pressure operation, is described with reference to FIG. 2.

The gluing unit glues the first corrugated web of the first corrugated cardboard web 2 laminated on one side with its first gluing roller. The second gluing roller is inactive, so that the second corrugated web of the second corrugated cardboard web 3 laminated on one side remains unglued.

As in an operation according to FIG. 1, the description of which is referred to, the first corrugated cardboard web 2 laminated on one side and the second corrugated cardboard web 3 laminated on one side are introduced into the first pressing nip 19 on the infeed side, where they are pressed against each other and glued together. The pressing belts 12, 15 are each driven in their circumferential direction 13 and 16 respectively.

The first corrugated cardboard web 2 laminated on one side and glued at the bottom is guided upstream to the first pressing nip 19 above the infeed heating element 21. The corrugated web steam feeding apparatus 22 ejects steam from below upwards so that it hits the first corrugated web of the first corrugated cardboard web 2 laminated on one side or the glue located there. This also heats up the glue. The first corrugated web of the first corrugated cardboard web 2 laminated on one side is located there below the first cover web of the first corrugated cardboard web 2 laminated on one side. The first corrugated cardboard web 2 laminated on one side enters the first pressing nip 19 on the infeed side or the inlet side, i.e. via the first infeed 19a, where the first corrugated web of the first corrugated cardboard web 2 laminated on one side is also located below the first cover web of the first corrugated cardboard web 2 laminated on one side.

The unglued second corrugated cardboard web 3 laminated on one side is guided along the infeed heating element 21 at the bottom and is heated by the latter from above. The second corrugated web of the second corrugated cardboard web 3 laminated on one side is located there below the second cover web of the second corrugated cardboard web 3 laminated on one side. It enters the first pressing nip 19 on the infeed side below the first corrugated cardboard web 2 laminated on one side, i.e. via the first infeed 19a, where the second corrugated web of the second corrugated cardboard web 3 laminated on one side is also located below the second cover web of the second corrugated cardboard web 3 laminated on one side. The corrugated web steam feeding apparatuses 18 are active and eject steam from below onto the second corrugated cardboard web 3 laminated on one side or its second corrugated web.

The first corrugated cardboard web 2 laminated on one side and the second corrugated cardboard web 3 laminated on one side are pressed against each other and glued together in the first pressing nip 19. They are conveyed through the first pressing nip 19 in the conveying direction 7.

The corrugated cardboard webs 2, 3 laminated on one side that are glued together then exit the first pressing nip 19 on the exit side or on the outlet side, i.e. via the outlet 19b, and are guided through the gluing unit 27, preferably without being deflected, in comparison with the operation according to FIG. 1, while the lower belt of the upper pressing belt 12 is guided past the gluing unit 27 at the top. The gluing unit 27 is active and applies glue from below with its glue application roller 29 to the second corrugated cardboard web 3 laminated on one side or its second corrugated web. The pressing roller 31 presses the second corrugated cardboard web 3 laminated on one side or its second corrugated web against the glue application roller 29 from above. The gluing unit 27 is, for example, in its upper gluing position.

The glue-steam feeding apparatus 32 is active and ejects steam from below onto the glue on the second corrugated web of the second corrugated cardboard web 3 laminated on one side.

Compared to the operation according to FIG. 1, here the laminating web 4 is guided through the laminating web guide 35, where it is heated from above or from its inside by the active laminating web heating elements 23. The inside of the laminating web 4 faces away from its outer side and is located on the inner side of the finished corrugated cardboard web 1 laminated on both sides. The lower pressing belt 15 or its underside presses the laminating web 4 at least in some regions against the laminating web heating elements 23 and ensures that the laminating web 4 is conveyed through the laminating web guide 35. The laminating web 4 is guided past the gluing unit 27 at the bottom.

The corrugated cardboard webs 2, 3 laminated on one side and the laminating web 4 then enter the second pressing nip 26 on the inlet side or infeed side, i.e. via the second infeed 26a, where the first corrugated cardboard web 2 laminated on one side, the second corrugated cardboard web 3 laminated on one side and the laminating web 4 are pressed against each other to form the corrugated cardboard web 1 laminated on both sides. The second corrugated cardboard web 3 laminated on one side and the laminating web 4 are glued together. The corrugated cardboard webs 2, 3 laminated on one side and the laminating web 4 are conveyed through the second pressing nip 26 in the conveying direction 7.

The corrugated cardboard web 1 laminated on both sides then leaves the second pressing nip 26 on the exit side or the outlet side, i.e. via the second outlet 26b.

Instead of two corrugated cardboard webs 2, 3 laminated on one side, the assembly 6 can also be used to produce a corrugated cardboard web 1 laminated on both sides with exactly one single corrugated cardboard web 2 or 3. The corrugated cardboard web 1 laminated on both sides is then three-ply. The modes of operation described are also possible in this case.

Figure 3:
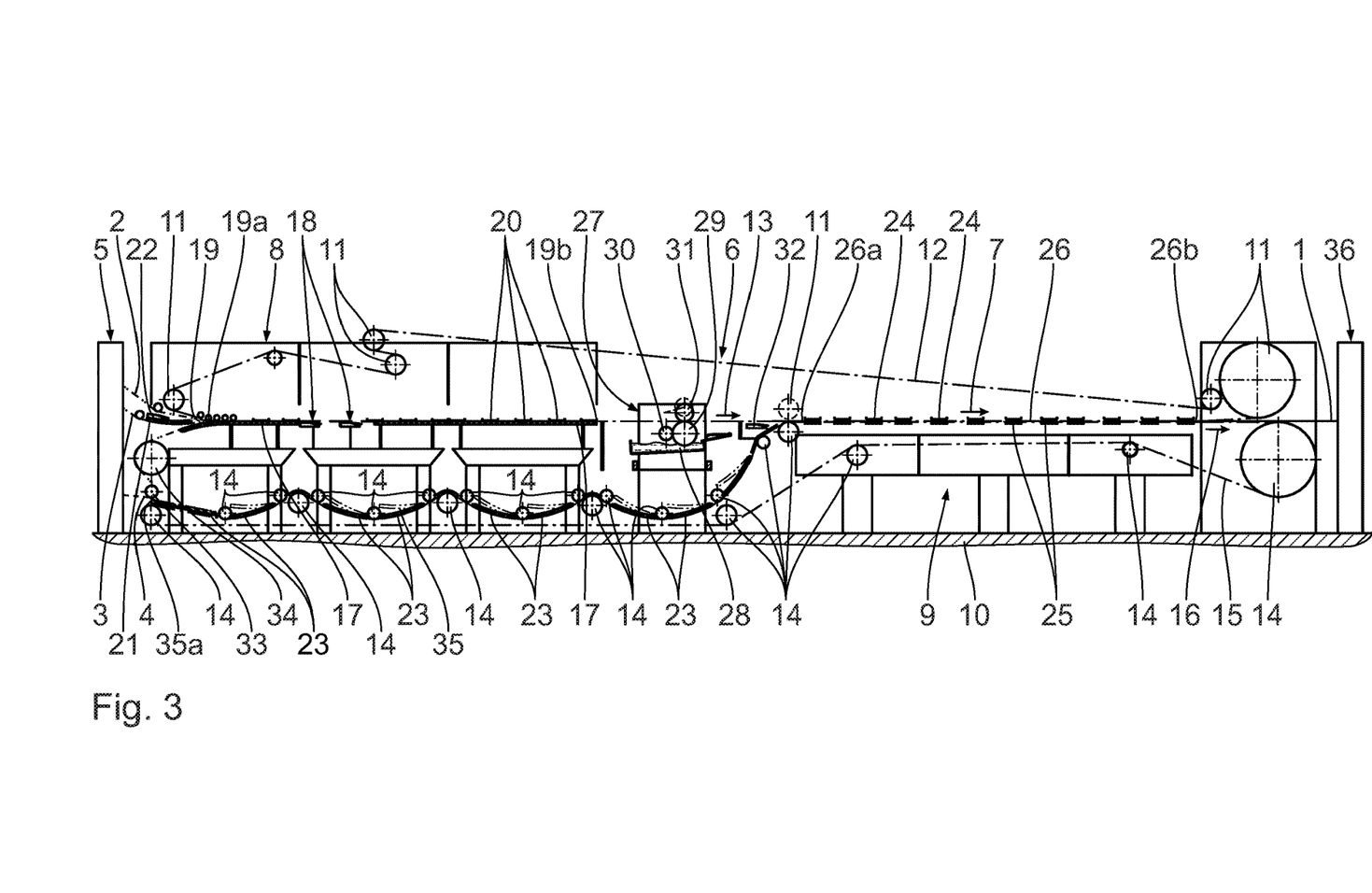
FIG. 3 shows an assembly according to the invention for producing a corrugated cardboard web laminated on both sides according to a second embodiment.
Figure 4:
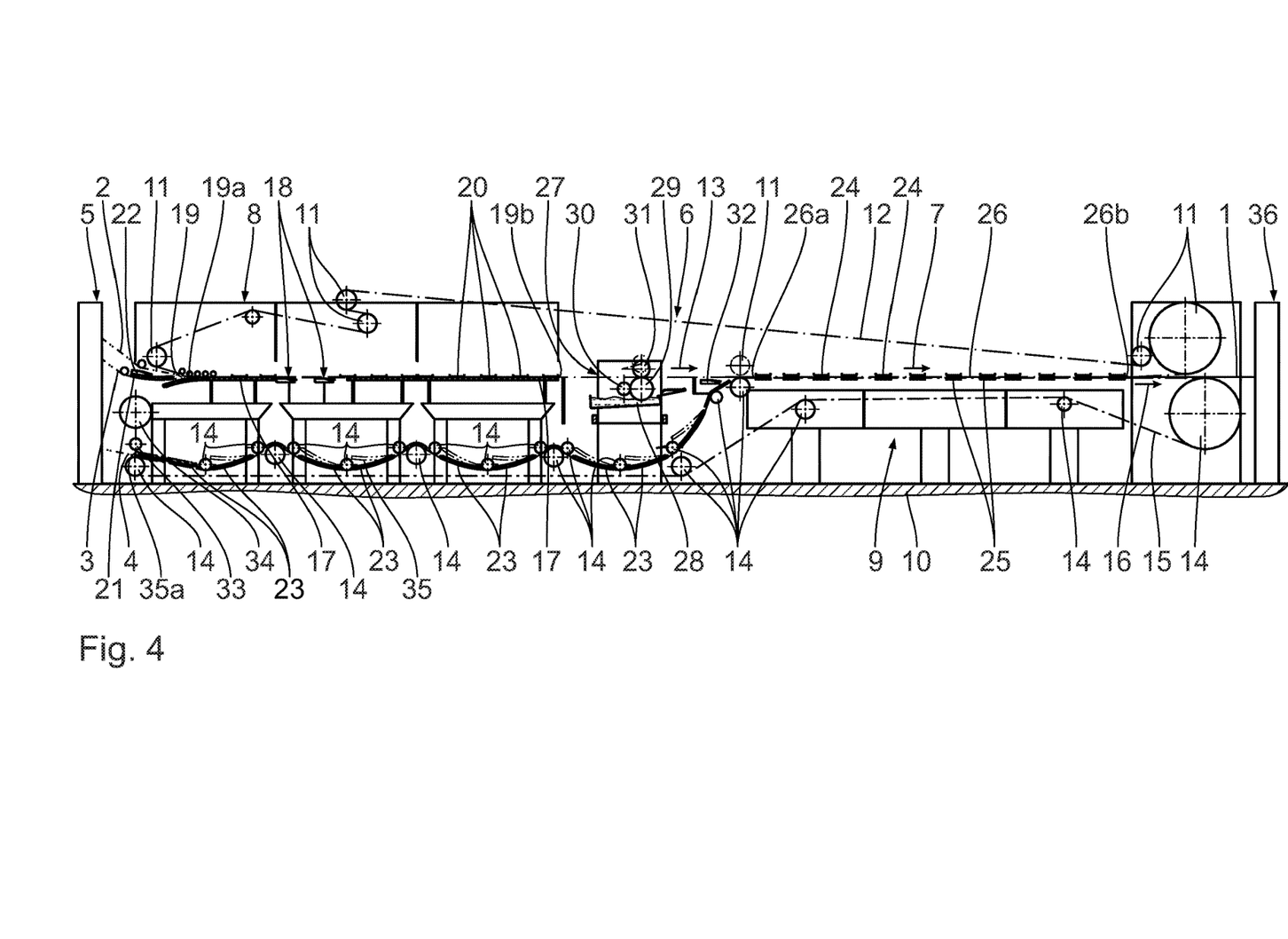
FIG. 4 shows the assembly shown in FIG. 3 for producing a corrugated cardboard web laminated on both sides, wherein, in contrast to FIG. 3, the laminating web is guided through a laminating web guide.

In the following, with reference to FIGS. 3, 4, a second embodiment of the assembly 6 for producing a corrugated cardboard web 1 laminated on both sides is described. In comparison with the first embodiment, the description of which is explicitly referred to, the lower belt of the upper pressing belt 12 runs through the gluing unit 27, passing between the glue application roller 29 and the pressing roller 31. As in the first embodiment, two different modes of operation are again possible here. The laminating web 4 can be guided through the first pressing nip 19 or the laminating web guide 35 to the second pressing nip 26.

In the following, with reference to FIG. 5, a severing and switch assembly 37 of the corrugated cardboard system is described, which can be used in all embodiments of the assembly 6 for producing a corrugated cardboard web 1 laminated on both sides.

Figure 5:
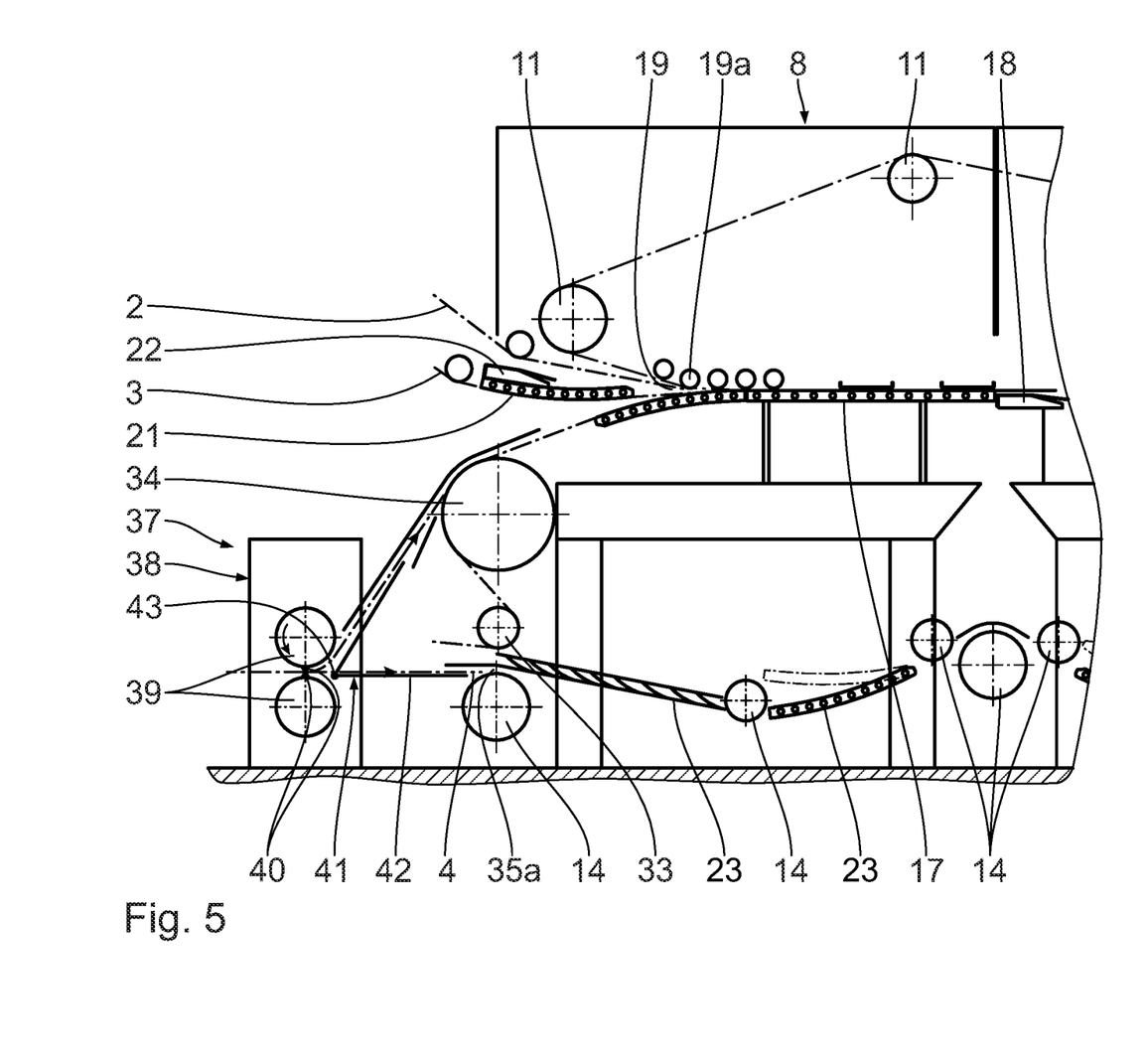
FIG. 5 shows a view illustrating an assembly according to the invention for producing a corrugated cardboard web laminated on both sides and a severing and switch assembly

Upstream of the assembly 6 for producing a corrugated cardboard web 1 laminated on both sides, as can be seen in FIG. 5, the severing and switch assembly 37 is arranged, which in turn is associated with the laminating web 4 and is capable of acting on the latter.

The severing and switch assembly 37 comprises a transverse severing apparatus 38, which in turn comprises two rotatably drivable transverse severing rollers 39 arranged one above the other and having radially outwardly extending blades 40. The blades 40 are capable of cooperating to produce a cut in the laminating web 4 that extends across the full width of the laminating web 4. For this purpose, the transverse severing rollers 39 are set in rotation accordingly.

The severing and switch assembly 37 also has a switch apparatus 41 which is arranged downstream of the transverse severing apparatus 38. The switch apparatus 41 has a plate-like switch element 42 which can be pivoted about a horizontal front pivot axis 43 between a lower, for example horizontal, switch position and an upper switch position. The pivot axis 43 extends in the transverse direction of the assembly 6 for producing a corrugated cardboard web 1 laminated on both sides.

In the lower switch position of the switch element 42, the laminating web 4 can be guided to the laminating web guide 35. In the upper switch position of the switch element 42, the laminating web 4 can be guided to the first pressing nip 19. The laminating web 4 is guided along the top of the switch element 42.

For a change of the laminating web 4 from the first pressing nip 19 into the laminating web guide 35, the transverse severing apparatus 38 is actuated so that the laminating web 4 is completely cut through in its transverse direction. The leading web section of the laminating web 4 is forced via the first pressing nip 19 used up to this point out of the corrugated cardboard system or the assembly 6 for producing a corrugated cardboard web 1 laminated on both sides.

The switch element 42 is then pivoted from its upper switch position to its lower switch position.

Subsequently, the trailing web section is guided or conveyed to the laminating web guide 35 via the switch apparatus 41.

A reverse change of the laminating web 4 from the laminating web guide 35 into the first pressing nip 19 is carried out essentially analogously.

Combinations of the embodiments are possible.

The invention claimed is:

1. An assembly for producing a corrugated cardboard web laminated on both sides from a laminating web and at least one corrugated cardboard web laminated on one side, the assembly comprising:
    at least one first pressing nip for guiding the at least one corrugated cardboard web laminated on one side;
    at least one heating element for heating at least one of the at least one corrugated cardboard web laminated on one side in the at least one first pressing nip;
    at least one second pressing nip, arranged downstream of the at least one first pressing nip, for pressing the at least one corrugated cardboard web laminated on one side and the laminating web against one another;
    a laminating web guide, spaced from the at least one first pressing nip for guiding the laminating web spaced from the at least one first pressing nip to the at least one second pressing nip;
    at least one first drivable pressing belt which spatially delimits the at least one first pressing nip at least in regions; and
    a gluing unit, arranged between the at least one first pressing nip and second pressing nip, for gluing the corrugated cardboard web laminated on one side that is to be glue-bonded to the laminating web, wherein the at least one first pressing belt is guided past the gluing unit.

2. The assembly according to claim 1, wherein the at least one first pressing belt also spatially delimits the at least one second pressing nip at least in regions.

3. The assembly according to claim 1, further comprising at least one second drivable pressing belt, which spatially delimits the laminating web guide at least in regions.

4. The assembly according to claim 3, wherein the at least one second pressing belt also spatially delimits the at least one second pressing nip at least in regions.

5. The assembly according to claim 3, further comprising at least one operable tension changing device for changing a tension of the at least one second pressing belt.

6. The assembly according to claim 1, wherein the gluing unit is capable of gluing from below the corrugated cardboard web laminated on one side that is to be glue-bonded to the laminating web.

7. The assembly according to claim 1, wherein the gluing unit is at least partially displaceable between an active position and an inactive position.

8. The assembly according to claim 7, wherein the gluing unit is displaceable in its entirety between the active position and the inactive position.

9. The assembly according to claim 8, wherein the gluing unit is displaceable in its entirety in at least one of a height direction and a transverse direction of the assembly.

10. The assembly according to claim 1, wherein at least one laminating web heating element is arranged to heat the laminating web in the laminating web guide.

11. The assembly according to claim 10, wherein the at least one laminating web heating element is curved.

12. The assembly according to claim 11, wherein the assembly is designed in such a manner that the laminating web is guidable either through the laminating web guide or the at least one first pressing nip to the at least one second pressing nip.

13. The assembly according to claim 10, wherein the at least one laminating web heating element is adjustable.

14. The assembly according to claim 10, wherein the laminating web is guided in the laminating web guide in such a manner that an outer side of the laminating web faces away from the at least one laminating web heating element.

15. The assembly according to claim 1, further comprising at least one corrugated web steam feeding apparatus for feeding steam to a respective corrugated web of the at least one corrugated cardboard web laminated on one side.

16. The assembly according to claim 1, further comprising at least one glue-steam feeding apparatus for feeding steam to glue of the corrugated cardboard web laminated on one side and to be glue-bonded to the laminating web.

17. The assembly according to claim 1, wherein a corrugated web of the corrugated cardboard web laminated on one side and to be glue-bonded to the laminating web is guided in such a manner and/or the at least one heating element is arranged in such a manner that the corrugated web faces the at least one heating element in the at least one first pressing nip.

18. The assembly according to claim 1, further comprising at least one contact pressure adjusting device for adjusting a contact pressure of the laminating web and the at least one corrugated cardboard web laminated on one side against one another.

19. The assembly according to claim 1, wherein the assembly is designed in such a manner that a gluing connection is established in the at least one first pressing nip between at least two of the corrugated cardboard webs laminated on one side and a gluing connection is established in the at least one second pressing nip between one of the corrugated cardboard webs laminated on one side and the laminating web in an offset manner.

20. The assembly according to claim 19, wherein the gluing connection is established offset in time.

21. A corrugated cardboard system for producing corrugated cardboard, the system comprising:
- a laminating web dispensing assembly for dispensing a laminating web;
- at least one production apparatus for producing a respective corrugated cardboard web laminated on one side; and
- an assembly for producing a corrugated cardboard web laminated on both sides from a laminating web and at least one corrugated cardboard web laminated on one side arranged downstream of the laminating web dispensing assembly and the at least one production apparatus for producing a respective corrugated cardboard web laminated on one side, the assembly comprising:
- at least one first pressing nip for guiding the at least one corrugated cardboard web laminated on one side;
- at least one heating element for heating at least one of the at least one corrugated cardboard web laminated on one side in the at least one first pressing nip;
- at least one second pressing nip, arranged downstream of the at least one first pressing nip, for pressing the at least one corrugated cardboard web laminated on one side and the laminating web against one another;
- a laminating web guide, spaced from the at least one first pressing nip for guiding the laminating web spaced from the at least one first pressing nip to the at least one second pressing nip;
- at least one first drivable pressing belt which spatially delimits the at least one first pressing nip at least in regions; and
- a gluing unit, arranged between the at least one first pressing nip and second pressing nip, for gluing the corrugated cardboard web laminated on one side that is to be glue-bonded to the laminating web, wherein the at least one first pressing belt is guided past the gluing unit.

22. The corrugated cardboard system according to claim 21, further comprising a glue application device, arranged upstream of the assembly, for applying glue at least to a corrugated web of the corrugated cardboard web laminated on one side and to be glue-bonded to the laminating web.

23. The corrugated cardboard system according to claim 21, further comprising a switch apparatus, which is arranged upstream of the assembly, for guiding the laminating web to the at least one first pressing nip or to the laminating web guide.

24. The corrugated cardboard system according to claim 23, further comprising at least one severing apparatus, arranged upstream of the switch apparatus, for severing the laminating web for a change of the laminating web between the at least one first pressing nip and the laminating web guide.

25. The corrugated cardboard system according to claim 23, wherein the switch apparatus is actuatable.

26. A method for producing a corrugated cardboard web laminated on both sides from a laminating web and at least one corrugated cardboard web laminated on one side, the method comprising the steps of:
- guiding the at least one corrugated cardboard web laminated on one side by means of at least one first pressing nip;
- heating at least one of the at least one corrugated cardboard web laminated on one side in the at least one first pressing nip by means of at least one heating element;
- pressing the at least one first corrugated cardboard web laminated on one side and the laminating web against one another by means of at least one second pressing nip which is arranged downstream of the at least one first pressing nip, wherein:
  - the laminating web is guidable to the at least one second pressing nip by means of a laminating web guide spaced from the at least one first pressing nip;
  - at least one first drivable pressing belt spatially delimits the at least one first pressing nip at least in regions;
  - a gluing unit is arranged between the at least one first pressing nip and second pressing nip for gluing the corrugated cardboard web laminated on one side that is to be glue-bonded to the laminating web;
  - the at least one first pressing belt is guided past the gluing unit.

* * * * *